Figure 1:
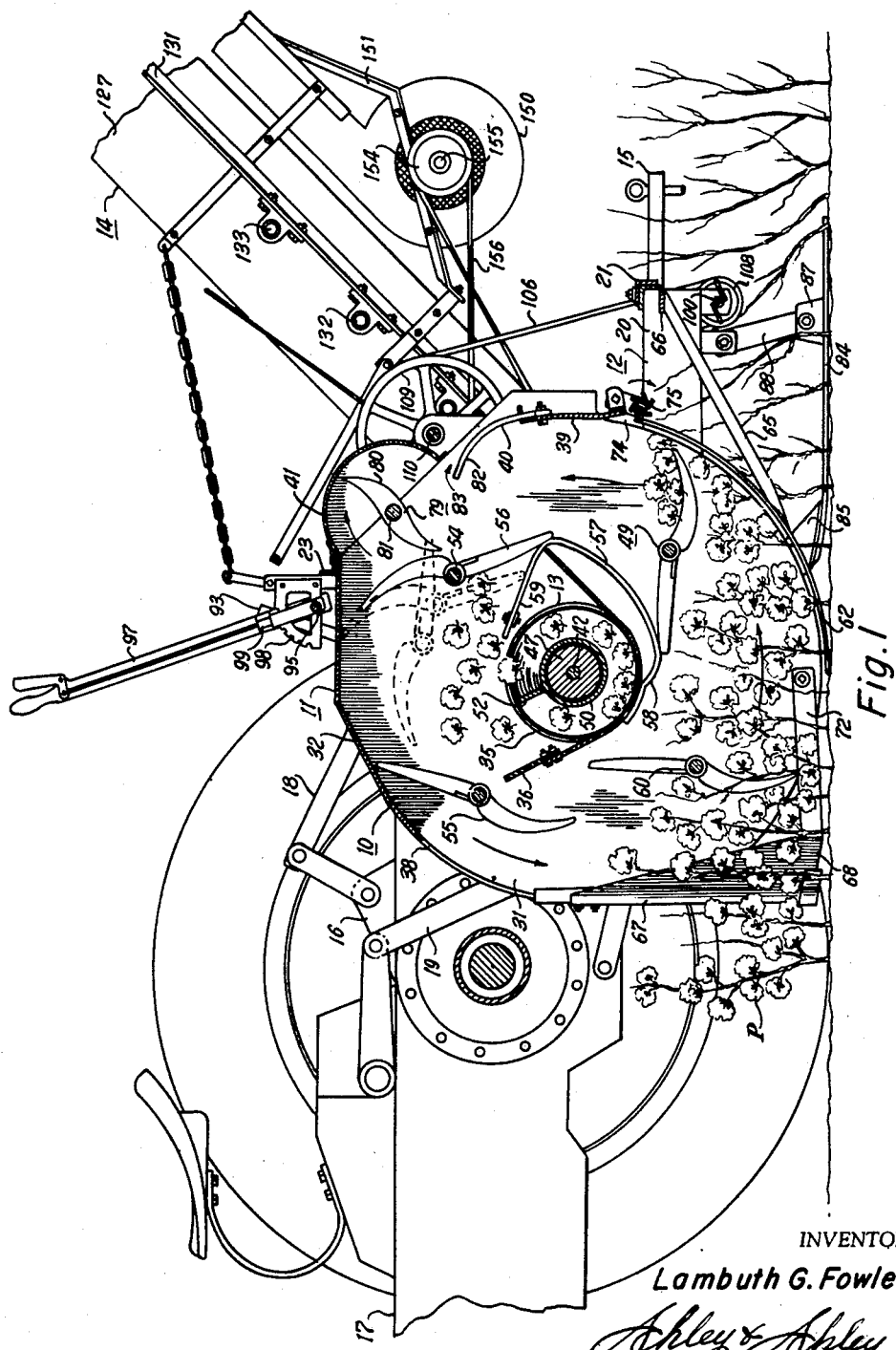

April 15, 1958   L. G. FOWLER   2,830,424
COTTON STRIPPER WITH FIXED STRIPPER COMB
Filed July 20, 1956   8 Sheets-Sheet 1

INVENTOR
Lambuth G. Fowler
BY
ATTORNEYS

INVENTOR
Lambuth G. Fowler
BY
ATTORNEYS

April 15, 1958 L. G. FOWLER 2,830,424
COTTON STRIPPER WITH FIXED STRIPPER COMB
Filed July 20, 1956 8 Sheets-Sheet 3
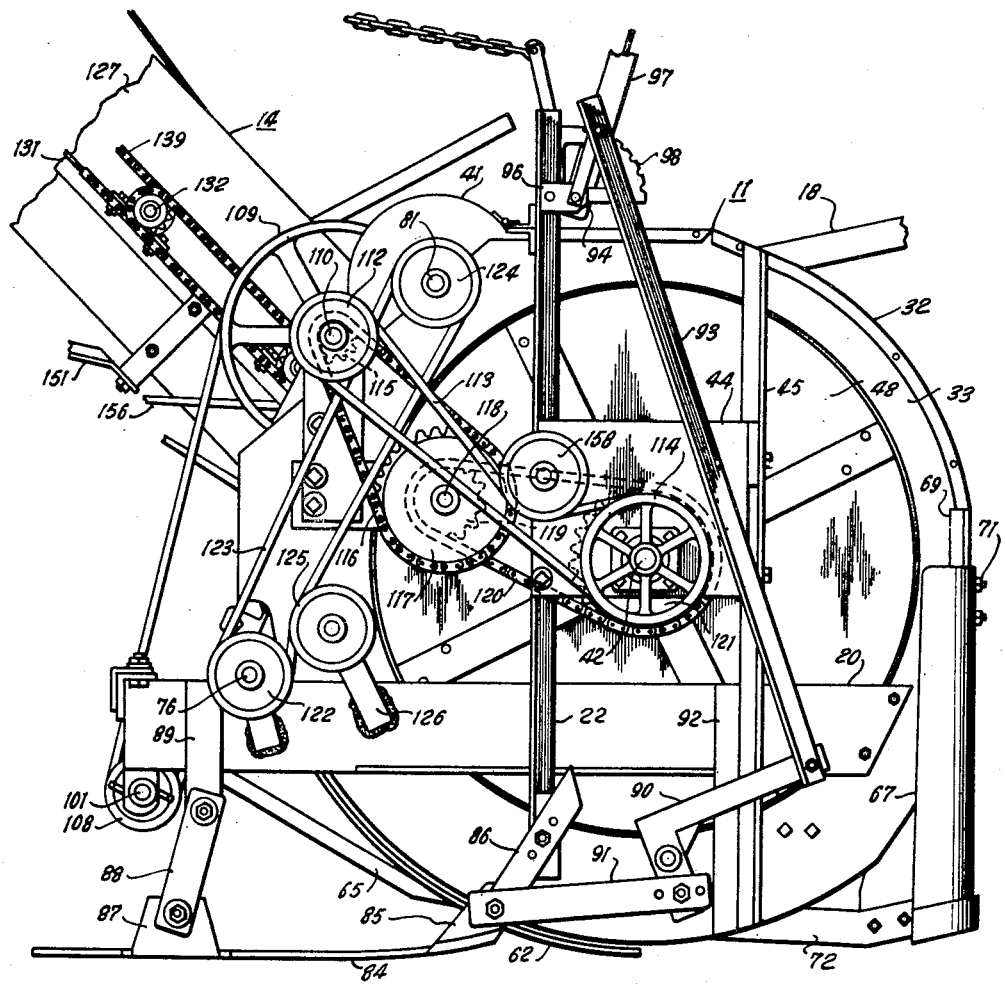
Fig. 3
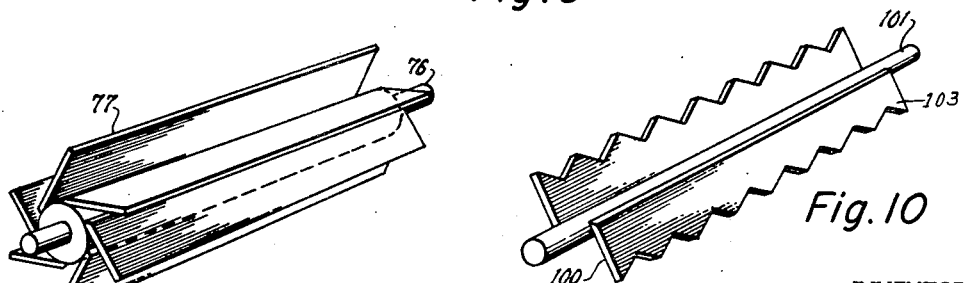
Fig. 9
Fig. 10
INVENTOR
Lambuth G. Fowler
BY *Ahley & Ahley*
ATTORNEYS April 15, 1958   L. G. FOWLER   2,830,424
COTTON STRIPPER WITH FIXED STRIPPER COMB
Filed July 20, 1956   8 Sheets-Sheet 4

INVENTOR
Lambuth G. Fowler
BY
ATTORNEYS

April 15, 1958  L. G. FOWLER  2,830,424
COTTON STRIPPER WITH FIXED STRIPPER COMB
Filed July 20, 1956  8 Sheets-Sheet 5

INVENTOR
Lambuth G. Fowler
BY
ATTORNEYS

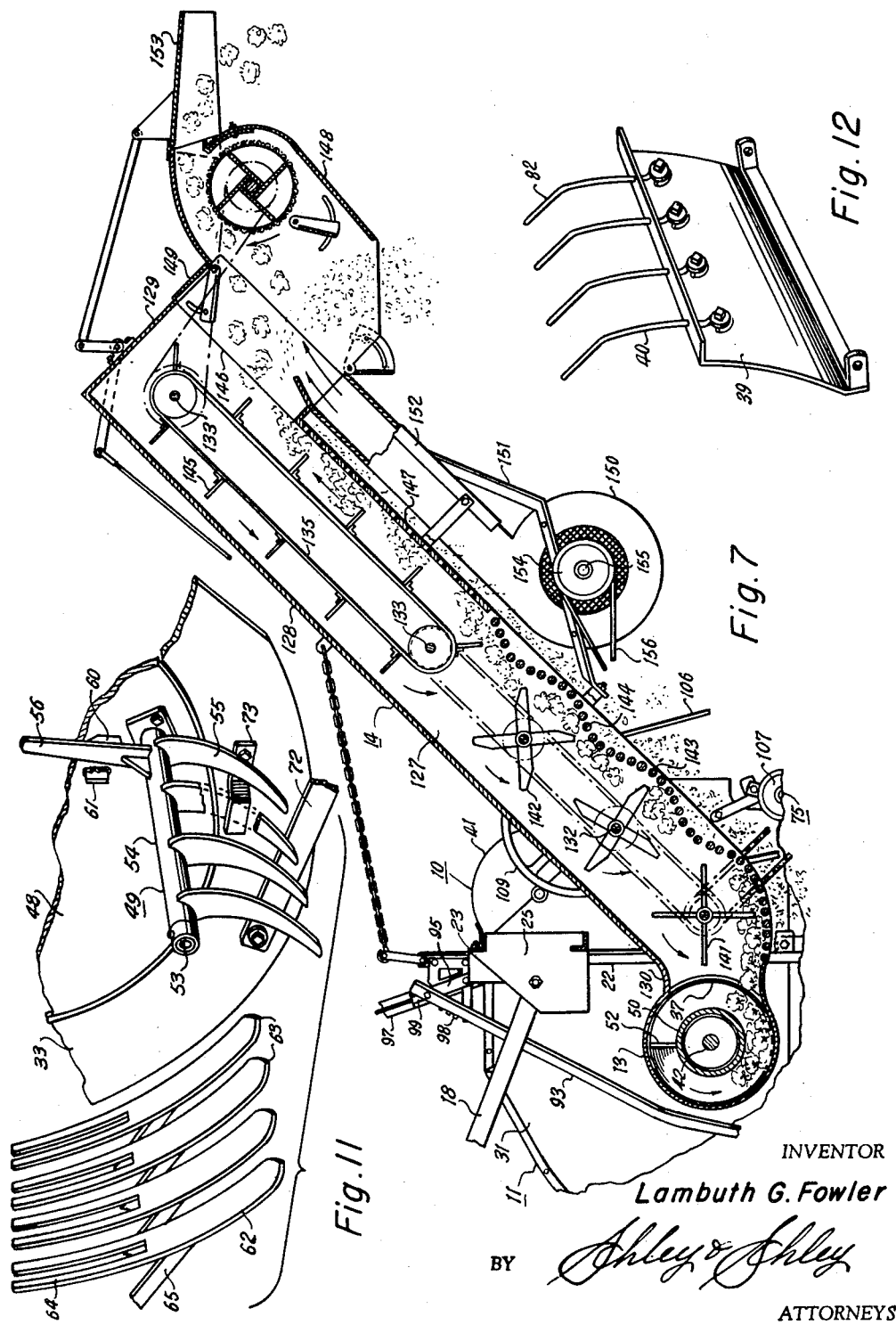

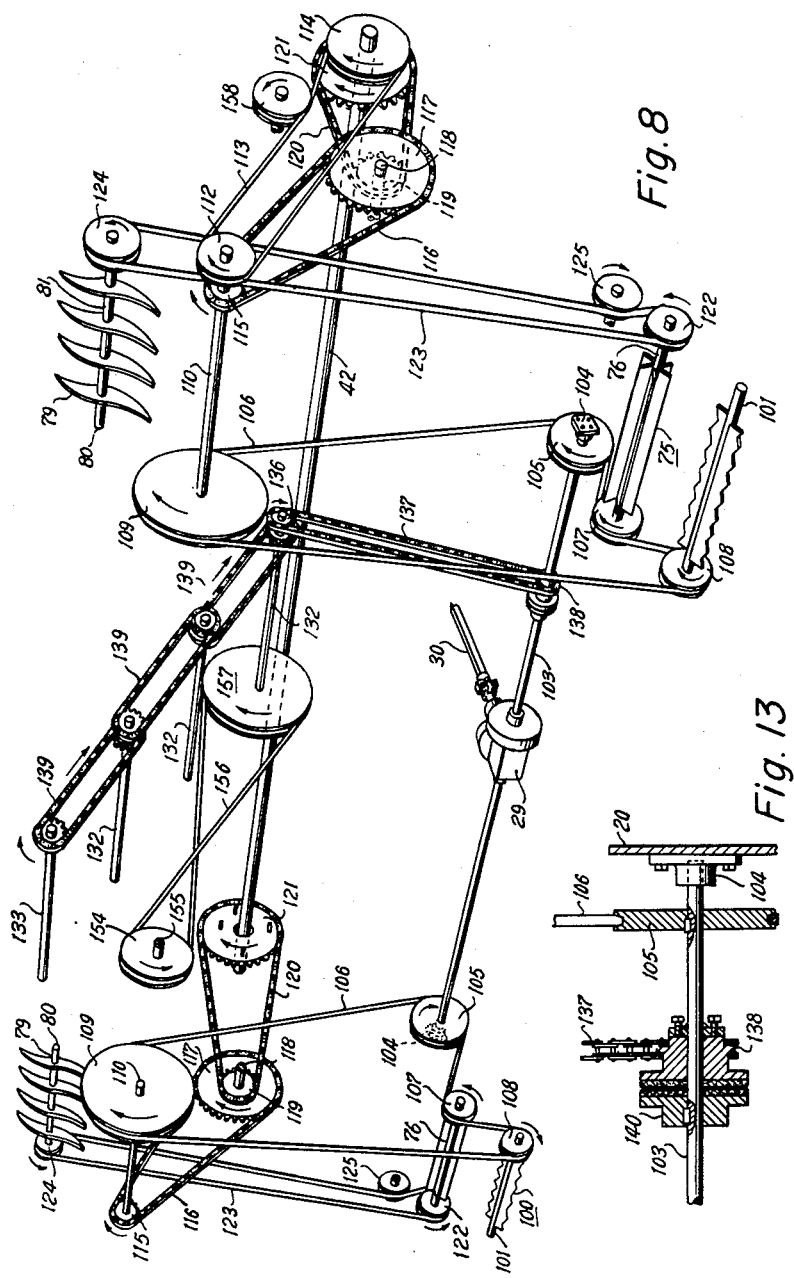

United States Patent Office 2,830,424
Patented Apr. 15, 1958

2,830,424

COTTON STRIPPER WITH FIXED STRIPPER COMB

Lambuth G. Fowler, Lubbock, Tex.

Application July 20, 1956, Serial No. 599,256

13 Claims. (Cl. 56—34)

This invention relates to new and useful improvements in cotton harvesters and more particularly to harvesters of the stripper type.

One object of the invention is to provide an improved cotton harvester for one or more rows having novel means for stripping cotton from the standing plants of each row and for separating the stripped cotton from extraneous matter prior to its discharge. A particular object of the invention is to provide an improved cotton harvester having a plurality of relatively flexible stripper members for receiving the stalks and branches of cotton plants of each row therebetween without breaking the plants and for coacting with slowly revolving elements to strip cotton from said plants with a minimum of leaves, stems and other extraneous matter, the elements being arranged to lift the stripped cotton and direct the same to separating means.

An important object of the invention is to provide an improved cotton harvester, of the character described, wherein the revolving elements are pivotally mounted and are arranged to pass rearwardly through the cotton plants, being moved into and held in operative position by engagement with said plants, whereby said elements lift cotton stripped from said plants by the stripping members without breaking the latter and without picking up excessive extraneous matter.

Another object of the invention is to provide an improved cotton harvester, of the character described, wherein the stripping means for each row includes separate means coacting with the stripper members and with the revolving elements for removing extraneous matter therefrom so as to prevent mixing of the same with the stripped cotton.

A further object of the invention is to provide an improved cotton harvester, of the character described, wherein each stripping means includes a substantially circular housing having a substantially horizontal axis and arcuate stripper fingers at the lower rear portion of the housing for receiving the branches and stalks of cotton plants therebetween, the coacting elements revolving about the axis of the housing and sweeping rearwardly over the fingers to lift cotton stripped from said plants by said fingers, the latter being flexibly mounted as well as flexible to permit movement and flexing thereof and prevent breaking or other damaging of the cotton plants and admixing of the portions of said plants with the stripped cotton.

Another object of the invention is to provide an improved cotton harvester, of the character described, having conveying means at the axis of the stripper housing for receiving the stripped cotton lifted by the revolving elements and directing said cotton to an elevator which has beaters in its lower portion for separating out extraneous matter.

A further object of the invention is to provide an improved cotton harvester, of the character described, wherein each stripping means includes cam means coacting with the revolving elements for pivoting said elements into positions supporting the stripped cotton for lifting and dumping the same into the conveying means.

A construction designed to carry out the invention will be hereinafter described, together with other features of the invention.

Figure 2:
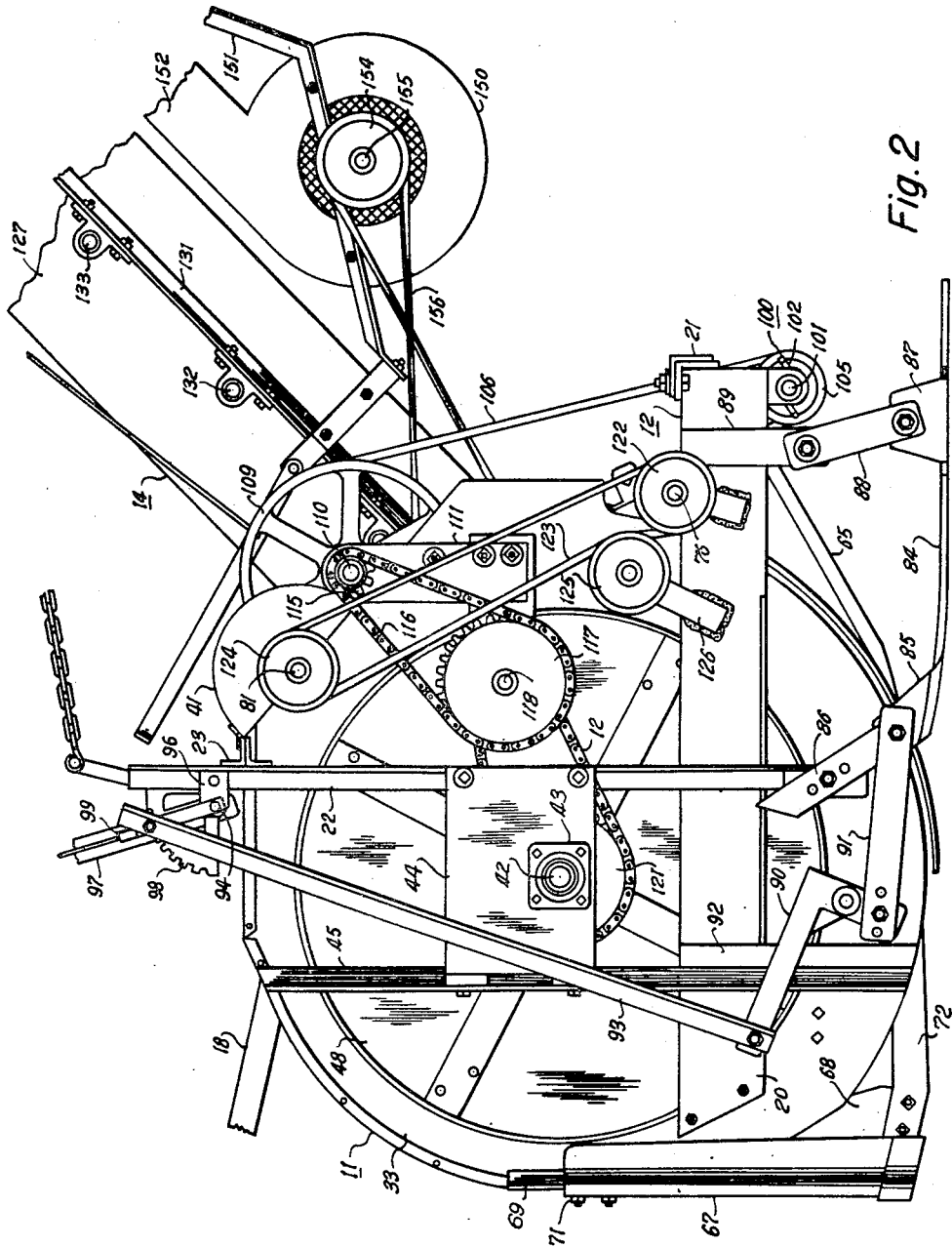
Figure 4:
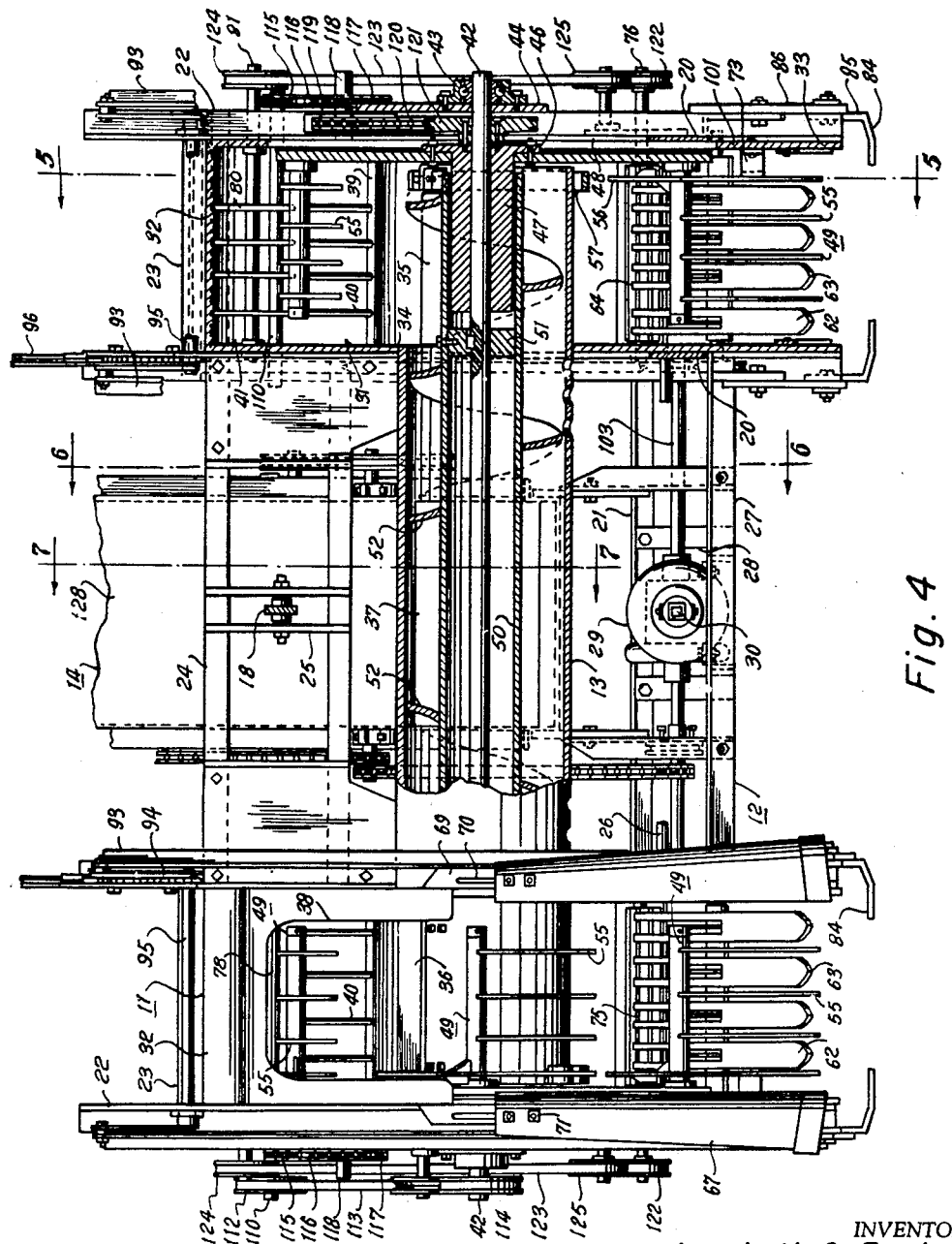
Figure 5:
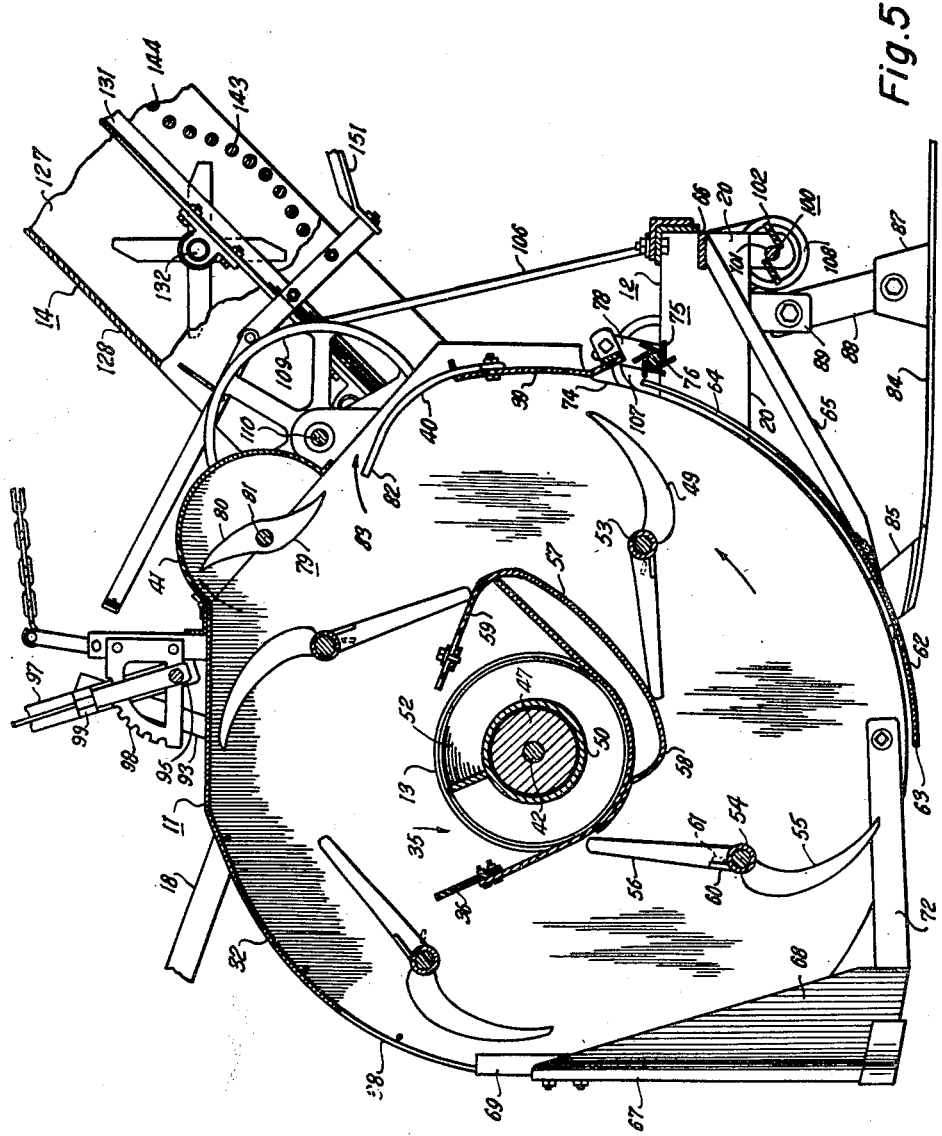
Figure 6:
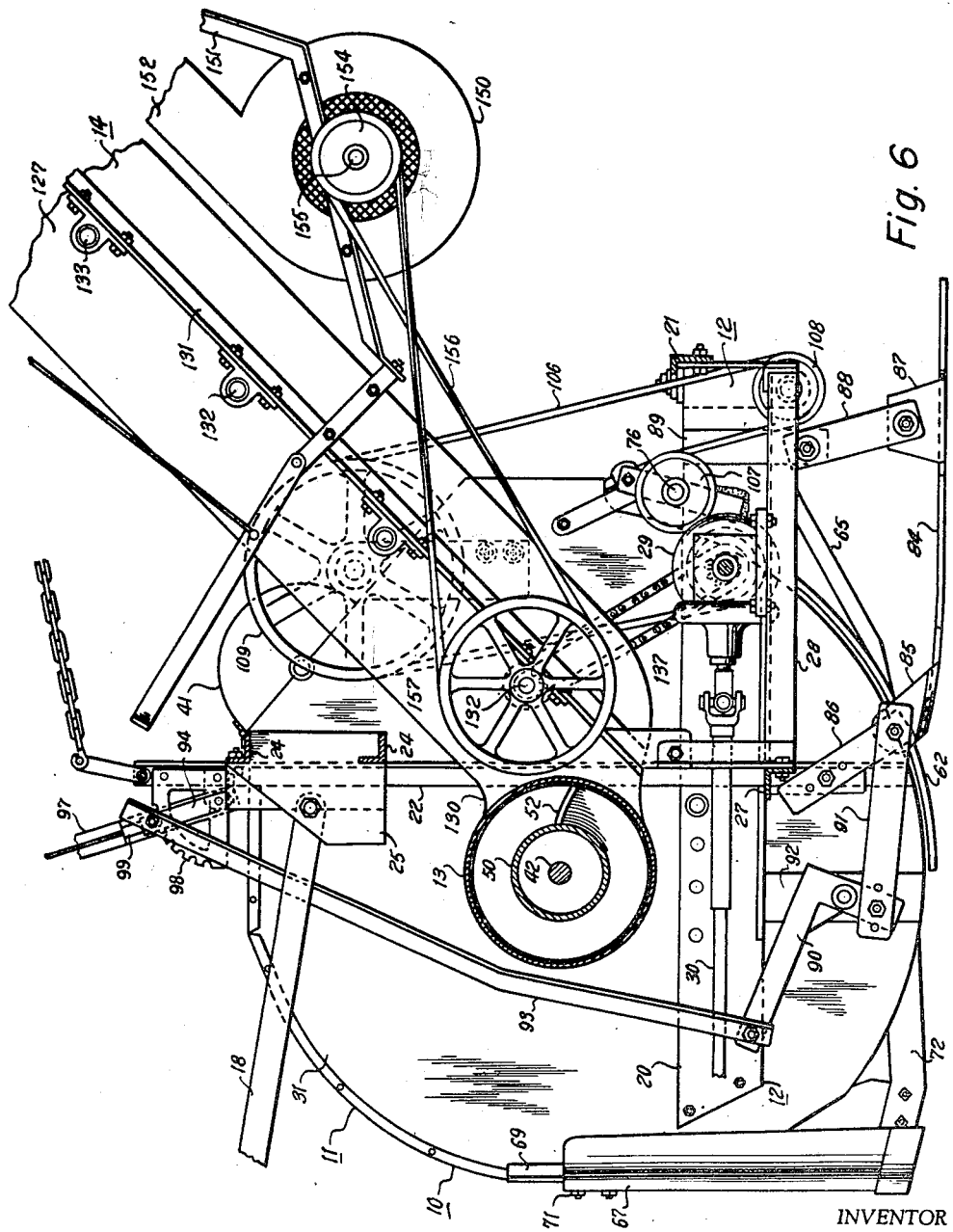

The invention will be more readily understood from a reading of the following specification and by reference to the accompanying drawings, wherein an example of the invention is shown, and wherein:

Fig. 1 is an elevational view with parts broken away and shown in section of a stripper type cotton harvester, constructed in accordance with the invention, mounted on a tractor and showing the stripping and lifting action, Fig. 2 is a side elevational view of the harvester, Fig. 3 is an opposite side elevational view of the harvester, Fig. 4 is a front elevational view, partly in section, of the harvester, Fig. 5 is a longitudinal, vertical, sectional view, taken on the line 5—5 of Fig. 4, Fig. 6 is a longitudinal, vertical, sectional view, taken on the line 6—6 of Fig. 4, Fig. 7 is a longitudinal, vertical, sectional view, taken on the line 7—7 of Fig. 4, Fig. 8 is a rear perspective view of the drive mechanism of the harvester, Fig. 9 is a perspective view of one of the rollers of the harvester, Fig. 10 is a perspective view of another roller, Fig. 11 is a perspective, schematic view showing the mounting of one of the revolving elements and its relation to the stripping fingers, Fig. 12 is a perspective view of the rear closure of one of the stripper housings, and Fig. 13 is a sectional view of a portion of the drive mechanism.

In the drawings, the numeral 10 designates a two-row cotton harvester of the stripper type which includes a pair of upright, substantially circular stripper housings 11 connected in spaced, parallel relationship by a suitable frame 12 and having a cylindrical conveyor casing or conductor 13 extending between and communicating with the alined, substantially horizontal axes of the housings. It is noted that one of the stripper housing 11 is provided for each row and that four and six row harvesters may be constructed in the same manner by the provision of additional stripper housings. Also, the invention is applicable to a one-row harvester. An inclined elevator housing 14 extends rearwardly and upwardly from the conveyor casing 13 between the stripper housings for discharging cotton into a trailer (not shown) which may be connected to the frame 12 by a rearwardly extending hitch member 15. The harvester 10 is adapted to be attached to the conventional rear lift mechanism 16 of a tractor 17 having a power take-off (not shown), the rear lift mechanism including the usual upper and lower links 18 and 19.

The frame 12 includes a plurality of horizontal, longitudinal, flat bars or beams 20 having their rear ends connected by a horizontal, transverse angle bar or member 21 and extending in parallel, spaced pairs with one beam being fastened to each side of each stripper housing 11 below its axis (Figs. 2–6). An upright angle bar or member 22 extends above the housing and rearwardly of its axis from the medial portion of each beam 20 and a horizontal, cross bar or member 23, which overlies said housing, connects the upper portions of the upright bars on opposite sides of each housing. The upper portions of the upright bars 22 at the inner sides of the stripper housings are connected by a pair of horizontal, transverse angle bars or members 24. A pair of upright plates or members 25 extend between the medial portions of the transverse bars 24 for pivotal connection with the upper link 18 of the rear lift mechanism 16, the lower links 19 of said mechanism being attached to transverse pins 26 carried by the inner longitudinal beams 20. The lower portions of the inner upright bars 22 are connected by a horizontal, transverse angle bar or member 27 which has its ends underlying the inner longitudinal beams 20. As shown most clearly in Figs. 4 and 6, a suitable hanger 28 extends longitudinally between and is supported by the rear, transverse bar 21 and the lower, transverse bar 27 and a right-angle drive or transmission 29 is mounted on the hanger between the rear portions of the inner beams 20 for connection with the power take-off of the tractor 17 by means of a telescoping shaft 30.

Each stripper housing 11 includes an upright, substantially circular, inner plate or wall 31 having a substantially arcuate top plate or wall 32 secured thereto and overlying the front, upper portion of the housing. A substantially annular plate or wall 33 is connected to the outer margin of the top wall 32 and has an external diameter substantially equal to the diameter of the inner wall 31. The beams 20 and upright bars 22 on each side of the housing coact to support the side plates or walls 31 and 33. An axial, circular opening 34 is formed in the inner wall for receiving and supporting one end of the cylindrical conveyor casing 13 which extends into each stripper housing and terminates adjacent the upright plane of the outer plate. For establishing communication between the conveyor casing and the stripper housing, an upwardly-directed hopper opening 35 is formed in each end of said casing by cutting and bending the wall thereof outwardly as shown in Figs. 1 and 5. A flexible deflector 36, of rubber or other suitable material, is fastened to and extends upwardly from the front margin of the hopper opening 35. As will be explained, the conveyor casing has an opening 37 in its rear medial portion communicating with the interior of the elevator housing 14 (Fig. 7).

It is noted that the front and bottom portions of each stripper housing are open and that an enlarged opening 38 is formed in the front portion of the arcuate top wall 32. A relatively short, upright closure plate or wall 39 is pivotally mounted between the medial, rear portions of the side plates or walls 31 and 33 and has a plurality of arcuate fingers or tines 40 extending upwardly therefrom for partially closing the rear, upper portion of the stripper housing (Fig. 12). Above the tines 40, the housing is closed by a semi-cylindrical hood or member 41 extending transversely between the side plates and preferably hinged to the overlying cross bar 23. Both the closure plate 39 and the hood 41 are adapted to be swung rearwardly to facilitate cleaning of the stripper housing.

For supporting the ends of a shaft 42 which extends axially of the conveyor casing 13, a bearing 43 is mounted on a plate 44 overlying the outer side of each stripper housing and attached to the outer upright bar 22 (Figs. 2–5). A parallel, upright bar 45 is connected to the front portions of the outer beam 20 and outer plate 33 for supporting the front end of the plate 44. Each end of the shaft 42 is adapted to rotatably support a hub 46 having an elongated, inwardly-directed bushing or sleeve member 47 made integral therewith (Fig. 4). A circular plate or disk 48 is fastened to the hub 46 between the end of the conveyor casing and the outer plate 33 and is of sufficient diameter to substantially close the opening formed in the outer side of the housing by the annular shape of said outer plate. As will be explained, the disk 48 is adapted to rotate in said housing about the axis of the shaft 42 for revolving a plurality of spaced sweeper elements 49 into contact with cotton stripped from standing plants P. A cylindrical sleeve 50 concentrically surrounds the shaft 42, being connected thereto by internal collars 51, and has its ends journalled upon the bushings 47 of the hubs 46. Helical conveyor blades 52 are carried by the end portions of the sleeve 50 and are reversed relative to each other for directing cotton inwardly from the stripper housings 11 to the medial opening 37 of the conveyor casing. Preferably, the inner ends of the helical blades 52 overlap the ends of the medial opening to assure the passage of the cotton from the conveyor casing into the elevator housing 14.

Each sweeper element 49 includes a shaft 53 extending transversely from the rotatable disk 48 across the interior of each stripper housing. A cylindrical housing or sleeve 54 is confined upon each shaft and has a plurality of spaced, cresent-shaped or curved fingers 55 extending transversely therefrom in substantially parallel relation to the disk 48 and tapering to reduced outer ends (Fig. 11). For controlling the position of the fingers 55, a lever 56 extends radially from the sleeve 54 opposite said fingers and is adapted to coact with a cam member or strip 57 carried by the end portion of the conveyor casing 13 adjacent the disk 48. As shown by the numeral 58, Figs. 1 and 4, the cam strip 57 extends downwardly and is curved abruptly below the axis of the stripper housing 11 for swinging the fingers 55 rearwardly or in a counter-clockwise direction when the sweeper elements are revolved to this point. From the curved portion 58, the cam strip extends at an upward and rearward inclination and then upwardly and forwardly around the rear edge of the hopper opening 35 so as to overlie its rear portion as shown by the numeral 59. Due to the rearward pivoting of the fingers 55 by the engagement of the lever 56 with the cam strip, said fingers support the cotton stripped from the plants and carry said stripped cotton rearwardly and upwardly through the housing 11. The forwardly-inclined portion 59 of the cam strip imparts additional counter-clockwise movement to each element to dump the stripped cotton into the hopper opening 35 as shown in broken lines in Fig. 1. For limiting clockwise pivoting of the sweeper elements, each lever 56 is provided with a lateral lug 60 for engagement with a coacting lug or projection 61 carried by the rotatable disk 48 adjacent each shaft 54.

The sweeper elements 49 are adapted to coact with a plurality of arcuate stripper members 62 which conform to the curvature of the stripper housing 11 and its rotatable disk and which are disposed at the lower, rear margin of said housing in closely-spaced, parallel relationship to one another (Fig. 11). Each stripper member is independent of and unattached to the other member and is in the form of a flat blade, or finger, of greater width than thickness, and has a pointed, lower, front end 63. In order to increase its flexibility, the upper, rear portion of each member 62 is bifurcated to provide an elongated opening or slot 64 in said portion. A plurality of inclined arms 65 extend between the medial portions of the stripper members and a horizontal, transverse bar or member 66 carried by the rear ends of the longitudinal beams 20 for supporting said members. Preferably, the members 62 are offset relative to the fingers 55 of the sweeper elements 49 whereby said fingers are adapted to sweep over the spaces between and alongside said members, which spaces are unobstructed. As will be explained, the stripper members are adapted to receive the stalks and branches of standing cotton plants P therebetween and to strip cotton from the plants and facilitate lifting of the stripped cotton by the slowly revolving elements (Fig. 1).

For guiding the cotton plants into each stripper housing 11, a pair of upright guard members 67 are provided at the front, lower portion of the housing below its top wall 32 and front opening 38. The guard members are substantially U-shaped in cross-section and have internal, rearwardly-extending wings 68 which decrease in width toward their upper ends (Fig. 5). Upright bars 69 are carried by the front margins of the side plates 31 and 33 and have longitudinal slots 70 for receiving suitable bolts and nuts 71 to adjustably support the guard members 67 (Fig. 4). The lower ends of the guard members are pivotally connected to the lower portions of the side plates by substantially horizontal arms or straps 72.

For urging the elements in a clockwise direction (Figs.

1 and 5) with the lugs 60 of their levers 56 engaged with lugs 61 of the rotatable disk 48, a resilient member or spring 73 is mounted on the inner surface of the annular plate 33 at its front, lower portion and extends inwardly and rearwardly for engagement by the outermost finger 55 of each revolving element (as shown in Figs. 4 and 11). Due to the slotted upper ends 64 of the stripper members 62, leaves, stems and other extraneous matter may be discharged from each stripper housing. The removal of this extraneous matter is facilitated by the provision of an opening 74 between the stripper members and the rear wall 39. A roller 75 extends longitudinally and externally of the opening 74 for directing extraneous matter rearwardly therefrom. As shown most clearly in Figs. 5 and 9, the roller includes an axial shaft 76 having substantially coextensive blades or vanes 77 extending tangentially therefrom and suspended from the rear wall 39 by suitable end brackets 78. As will be explained, the roller 75 is adapted to be rotated in a clockwise direction. It is noted that the blades 77 strike the upper ends 64 when the stripper members flex rearwardly so as to vibrate said members to prevent the branches and stalks of cotton plants from hanging, breaking off and clogging the spaces between said members. As a result, the cotton branches and stalks are dislodged from engagement with the stripper members and prevented from being entrained with the stripped cotton. It is noted that the clockwise rotation of the roller 75 permits salvaging of cotton which clings to the stripped plants by directing the cotton back into the stripper housing.

A rotary comb element 79 is mounted in the upper, rear portion of the stripper housing for coacting with the sweeper elements 49 during their dumping action. As shown in Figs. 1 and 5, the comb element is mounted adjacent the hood 41 for rotation therein and includes a plurality of teeth 80 carried by a horizontal, transverse shaft 81 for meshing with the fingers 55. The teeth 80 extend substantially diametrically from the shaft 81 and have their end portions arched or curved counter-clockwise in opposite directions and terminating in pointed ends. In addition to cleaning the fingers 55, the teeth tend to dislodge cotton from therebetween and direct the same into the hopper opening 35 due to the clockwise rotation of the comb element 79. Any cotton picked up by the teeth is carried through the hood 41 and falls into the housing onto the upwardly moving sweeper element, while extraneous matter may be discharged through the tines 40 below said hood. As shown by the numeral 82, the upper ends of the tines are directed forwardly and inwardly a slight distance into the housing and in spaced relationship below the hood to provide a discharge opening 83 therebetween.

A pair of skids 84 is provided below each stripper housing for supporting the harvester and each skid is in the form of a flat runner having a lateral front end portion 85 bent upwardly for pivotal connection to the lower end of one of the upright bars 22 by a link 86. The rear portion of each skid has an upstanding lug 87 pivotally connected by a link 88 to a strap 89 depending from the rear portion of one of the longitudinal beams 20. Since the effective lengths of the links 86 and 88 are the same, the skids 84 may be swung to vary the elevation of the harvester and its stripper housings without changing the angular relationship of said skid. A bell crank 90 has one end pivotally connected by a short lever 91 to the front end portion 85 of each skid and is pivotally mounted on a strap or other member 92 suspended from each beam. The opposite end of the bell crank 90 is pivotally connected to an elongated lever 93 which extends above the stripper housing and which has its upper end pivotally connected by a depending link 94 to a rock shaft 95 overlying said housing. Suitable brackets 96 extend forwardly from the upright bars 22 for supporting the shaft 95 and an upstanding lever 97 is secured to one end of said shaft for rocking the same. An arcuate ratchet 98 and conventional pawl means 99 are provided for latching the lever 97 in adjusted positions whereby the skids 84 may be raised and lowered to vary the elevation of the stripper housing in accordance with the condition of the cotton. At the rear ends of the beams 20, a roller 100 is mounted for counter-clockwise rotation and includes a horizontal, transverse shaft 101 supported by depending end brackets 102. A pair of substantially coextensive, notched or serrated blades or vanes 103 extend diametrically from the shaft 101 in opposite directions for urging the stripped cotton plants rearwardly from between the stripper members 62 (Fig. 10).

The action of the stripping operation is shown most clearly in Fig. 1, wherein the standing cotton plants P of each row are guided or directed into the stripper housing 11 alined therewith by the guard members 67. As will be apparent, the slow rotation of the disk 48 slowly revolves the sweeper elements 49 into engagement with the plants. Due to the spring member 73, each element is pivoted to its clockwise position whereby its fingers 55 gently contact the plants and travel therethrough in a steady, continuous, sweeping motion without rocking or other abrupt movement. Upon engagement of its lever 56 with the cam strip 57, the rearwardly moving element is pivoted counter-clockwise so as to swing its fingers upwardly through the plants for lifting the cotton stripped from said plants. The stripper members 62 receive the branches and stalks of the plants therebetween to strip the cotton from said plants and the fingers, which sweep over the spaces between said members, continually remove the stripped cotton and keep said spaces open for receiving said branches and stalks. Due to the provision of the sweeper elements, the stripper members may engage the ground to receive the cotton bolls adjacent and on the ground therebetween. The sweeper elements continually sweep the stripper members throughout their lengths to clean the same and prevent clogging of the spaces between said members. Any dirt picked up by the stripper members is discharged through the spaces as well as the slots 64 and opening 74. The coacting relationship of the sweeper elements and stripper members permits the efficient harvesting of cotton from very low plants as well as from plants having limber stalks. Also, bushy cotton plants or plants having large stalks can be stripped efficaciously by this harvester.

Due to their flexibility and flexible mounting, the members may flex and move laterally to accommodate bushy plants or plants having large stalks and prevent breaking or uprooting of said plants. In fact, the stripper members may move independently of one another and in accordance with the varying diameters of individual stalks throughout the travel of the stalks therebetween. As a result, the stripper members may be, and preferably are, closely spaced for snug engagement with the branches and stalks to strip cotton therefrom without breaking the plants. As explained, the upwardly moving element lifts the stripped cotton and carries the same to the conveyor hopper opening 35. Some of the extraneous matter escapes through the slots 64 at upper ends of the members and the opening 74 is directed outwardly and rearwardly by the roller 75, while other extraneous matter is discharged between the tines 40 and through the opening 83. The latter discharge is assisted by the action of the comb element 79 which removes extraneous matter from between the fingers 55. In addition, the comb element coacts with the fingers in directing the cotton into the hopper opening, said fingers being swung further counter-clockwise by the curvature of the cam strip. From the hopper opening, the helical conveyor blade 52 carries the cotton to the medial opening 37 of the casing 13 which communicates with the lower end of the elevator housing 14 (Figs. 4 and 7).

For driving the various shafts of the harvester, a horizontal, transverse, drive shaft 103 extends from both sides of the right-angle drive 29 and has its ends journaled in suitable bearings 104 mounted on the inner longitudinal beams 20. A pulley 105 is carried by each end portion of the drive shaft 103 for driving an endless belt 106 which is trained over pulleys 107 and 108 fixed on the inner ends of the shafts 76 and 101, respectively (Fig. 8). Also, each belt 106 passes over a pulley 109 carried by the inner end of a jack shaft 110 mounted at the rear of each stripping housing 11 below the hood 41 on suitable brackets or straps 111. The pulleys 105, 108 and 109 turn in clockwise direction, while the pulley 107 turns in the opposite direction. A pulley 112 is fixed on the outer end of one of the jack shafts 110 and is connected by an endless belt 113 to a pulley 114 carried by the outer end of the conveyor shaft 42 for turning the latter in a clockwise direction. Each jack shaft has a small sprocket 115 on its outer portion connected by an endless chain 116 to a larger sprocket 117 mounted on stub shaft 118 which carries a smaller sprocket 119. A chain 120 connects the sprocket 119 to a larger sprocket 121 carried by the hub 46 whereby the disk 48 and its stripper elements 49 are turned slowly relative to the other shafts. The shaft 76 has a pulley 122 on its outer end connected by an endless belt 123 to a pulley 124 on the outer end of the shaft 80 of the comb element 79. An idler pulley 125, mounted on a bracket 126 upstanding from the outer beam 20 (Figs. 2 and 3), may engage each belt 123 for tightening the same. Preferably, the belt 113 is tensioned by a similar pulley 158.

The elevator housing 14 is of elongated, rectangular contour and includes longitudinal side and top walls 127 and 128, an upper end wall 129 and a collar or transition 130 at its lower end connected to the conveyor casing 13 (Fig. 7). External angle bars or frame members 131 extend longitudinally and medially of the side walls 127 for supporting the ends of shafts 132 and 133 of beaters 134 and an endless conveyor 135, respectively, which shafts extend transversely between said side walls. The lowermost beater shaft 132 carries a sprocket 136 which is connected by an endless chain 137 to a sprocket 138 mounted on the drive shaft 103 (Fig. 8). Similar chain and sprocket drives 139 connect the beater shafts to one another and the uppermost beater shaft to the lowermost conveyor shaft 133 whereby all of said shafts are driven in a clockwise direction. In order to prevent slippage of this drive arrangement, the sprocket 138 is connected to the shaft 103 by a conventional friction clutch or coupling 140 (Fig. 13). Preferably, three beaters 134 are employed and the same are dispersed in the lower portion of the housing 14. As shown in Fig. 7, the lowermost beater includes relatively flexible blades or paddles 141, of rubber or other suitable material, while rigid, radial fingers or tines 142 are carried by the other beaters.

An undulating foraminous bottom wall 143, formed of transverse, spaced bars 144, underlies the beaters and conforms to the arcs of rotation thereof for coacting with said beaters to separate and drop out a large portion of dirt, burrs, sticks, stems and fine trash. The blades 141 of the lowermost beater coact with the bars 144 to break open the cotton bolls into locks and permit dislodging of the cotton therefrom, whereby the burrs may be subsequently separated from the cotton. The fingers or tines 142 of the uppermost beater are adapted to continuously feed cotton beneath the lower end of the conveyor 135.

The endless conveyor extends longitudinally of the upper portion of the housing and includes conventional blades or paddles 145 for carrying cotton and extraneous matter from the beaters to a bottom discharge opening 146 adjacent the end wall 129. A foraminous bottom screen or wall 147 extends between the undulating wall 143 and the discharge opening so as to underlie the major portion of the conveyor for dropping out additional fine matter. The discharge opening 146 communicates with an underlying separator 148 which is connected to the housing by a collar or transition 149 and which projects rearwardly therefrom. A blower 150 is suspended from the medial portion of the elevator housing 14 by a suitable bracket 151 and has a duct 152 extending upwardly therefrom to the transition 149 in spaced, underlying, relation to said housing. The blower and its duct are adapted to direct a current or stream of air into the separator 148 for separating mature cotton from extraneous matter of greater specific gravity and for discharging said cotton through a nozzle 153 at the upper, rear end of said separator. It is believed unnecessary to describe the separator, since it is identical to the separator shown in my copending application, supra. For driving the blower 150, a pulley 154 is mounted on its shaft 155 and is connected by an endless belt 156 to a pulley 157 carried by one end of the lowermost beater shaft 132. (Fig. 8.)

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A cotton harvester including a housing having an open lower portion for straddling a row of cotton plants, stripper members at the lower portion of the housing for receiving the stalks and branches of the plants therebetween to strip cotton from said plants, means mounted in said housing for rotation about a horizontal, transverse axis, and a plurality of sweeper elements carried by the rotatable means for revolution about the axis whereby the elements are revolved through the plants and sweep over the stripper members to lift cotton stripped from the plants, the sweeper elements being pivotally mounted on said rotatable means for swinging movement in a plane parallel to the plane of revolution.

2. A cotton harvester including an upright housing having an open lower portion for straddling a row of cotton plants, stripper members at the lower portion of the housing for receiving the stalks and branches of the plants therebetween to strip cotton from said plants, means mounted in said housing for rotation about a horizontal, transverse axis, a plurality of sweeper elements carried by the rotatable means for revolution about the axis whereby the elements are revolved through the plants and sweep over the stripper members to lift cotton stripped from the plants, and separate means for flexibly supporting each stripper member whereby said members may undergo movement relative to one another so as to prevent breaking and uprooting of the cotton plants.

3. A cotton harvester including a stripper housing having upright side walls and an open lower portion for straddling a row of cotton plants, a plurality of spaced stripper members between the side walls at the lower portion of the housing for receiving the stalks and branches of the cotton plants therebetween and stripping cotton from said plants, a plurality of sweeper elements extending transversely between said walls, and rotatable means for supporting the sweeper elements for revolution about a horizontal, transverse axis within said housing whereby said elements are revolved through the plants and sweep over the stripper members to lift cotton stripped from the plants, said sweeper elements being pivotally mounted on the rotatable means for swinging movement in a plane parallel to the plane of revolution, each element including a plurality of spaced fingers extending in parallel relation to said plane of revolution for engaging the cotton plants and sweeping over the stripper members.

4. A cotton harvester including a stripper housing having upright side walls and an open lower portion for straddling a row of cotton plants, a plurality of spaced stripper members between the side walls at the lower portion of the housing for receiving the stalks and branches of the cotton plants therebetween and stripping cotton from said plants, a plurality of sweeper elements extending transversely between said walls, rotatable means for supporting the sweeper elements for revolution about a horizontal, transverse axis within said housing whereby said elements are revolved through the plants and sweep over the stripper members to lift cotton stripped from the plants, said sweeper elements being pivotally mounted on the rotatable means for swinging movement in a plane parallel to the plane of revolution, each element including a plurality of spaced fingers extending in parallel relation to said plane of revolution for engaging the cotton plants and sweeping over the stripper members, and stop means on said rotatable means adjacent each element for limiting swinging movement of the element in a direction away from the plants upon initial engagement therewith.

5. A cotton harvester as set forth in claim 4 including means on one of the side walls at the front, lower portion of the housing for engagement by the sweeper elements whereby each element is swung into engagement with its stop means and held against rocking upon initial engagement with the cotton plants.

6. A cotton harvester as set forth in claim 4 including cam means mounted in the housing below and rearwardly of the horizontal transverse axis of rotation and between said axis and the path of revolution of the sweeper elements, and a lever carried by each sweeper element for engagement with the cam means to swing the fingers of said elements upwardly through the cotton plants and over the stripper members for lifting the stripped cotton.

7. A cotton harvester including a stripper housing having upright side walls and an open lower portion for straddling a row of cotton plants, a plurality of spaced stripper members between the side walls at the rear, lower portion of the housing for receiving the stalks and branches of the cotton plants therebetween and stripping cotton from said plants, a plurality of sweeper elements extending transversely between said walls, rotatable means for supporting the sweeper elements for revolution about a horizontal, transverse axis within said housing whereby said elements are revolved through the plants and sweep over the stripper members to lift cotton stripped from the plants, said stripper members including a plurality of arcuate flexible blades substantially conforming to the curvature of the path of revolution of said sweeper elements, and a separate member connected to the rear surface of each blade at its intermediate portion for independently supporting the blade whereby the blades have unobstructed spaces therebetween and may flex and move relative to one another for snug engagement with the stalks and branches of the cotton plants to strip cotton therefrom without breaking or uprooting said plants.

8. A cotton harvester as set forth in claim 7 including rotating means extending transversely and rearwardly of the upper, rear ends of the blades and coacting with said ends to direct extraneous matter rearwardly from the stripper housing and prevent clogging of the spaces between said blades.

9. A cotton harvester including a stripper housing having upright side walls and an open lower portion for straddling a row of cotton plants, a substantially horizontal conveyor casing extending transversely of the housing through the medial portion of one of the side walls and having an upwardly directed opening communicating with said housing, a plurality of arcuate stripper members at the rear, lower portion of said housing and extending in substantially parallel relation to and between said walls for receiving the stalks and branches of the cotton plants therebetween and stripping cotton from said plants, a plurality of sweeper elements mounted in said housing and extending transversely between said walls, and rotatable means adjacent one of said walls for supporting the sweeper elements for revolution about the axis of the conveyor casing and rearward movement through the plants whereby the sweeper elements revolve forwardly over said casing, each sweeper element including a plurality of fingers extending in substantially parallel relation to said walls for sweeping over the stripper members to lift cotton stripped from the plants and carry the stripped cotton to the opening of said conveyor casing, said sweeper elements being pivotally mounted on and extending laterally from the rotatable means for swinging movement in a plane parallel to the plane of revolution.

10. A cotton harvester as set forth in claim 9 including cam means extending below and rearwardly around the conveyor casing in the path of revolution of the sweeper elements, each element engaging the cam means to swing its fingers upwardly through the cotton plants and over the stripper members for lifting the stripped cotton and then forwardly for dumping the cotton into the opening of said conveyor casing.

11. A cotton harvester as set forth in claim 9 including stop means on the rotatable means adjacent each sweeper element for limiting swinging movement of the element in a direction away from the cotton plants upon initial engagement therewith.

12. A cotton harvester as set forth in claim 11 including means on one of the side walls at the front lower portion of the stripper housing for engagement by the sweeper elements whereby each element is swung into engagement with its stop means and held against rocking upon initial engagement with the cotton plants.

13. A cotton harvester as set forth in claim 9 including a comb element mounted at the rear, upper portion of the stripper housing and extending transversely between the side walls for rotation in a direction opposite to the revolution of the sweeper elements, and teeth carried by the comb element in substantially parallel relation to said walls for meshing with the fingers of each sweeper element and coacting therewith to direct the cotton into the opening of the conveyor casing.

References Cited in the file of this patent

UNITED STATES PATENTS

| | | |
|---|---|---|
| 1,723,587 | Trout | Aug. 6, 1929 |
| 1,842,737 | Tharp | Jan. 26, 1932 |
| 2,504,459 | Schneider et al. | Apr. 18, 1950 |
| 2,517,063 | Wallace | Aug. 1, 1950 |
| 2,544,411 | Altgelt | Mar. 6, 1951 |
| 2,691,862 | Johnson, Jr. | Oct. 19, 1954 |